P. GERLI AND O. A. ROSS.
ARTILLERY AIRPLANE OR THE LIKE.
APPLICATION FILED JUNE 15, 1918.
1,342,802.
Patented June 8, 1920.
4 SHEETS—SHEET 3.
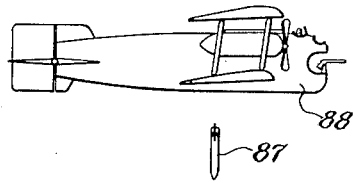
Fig. 4,
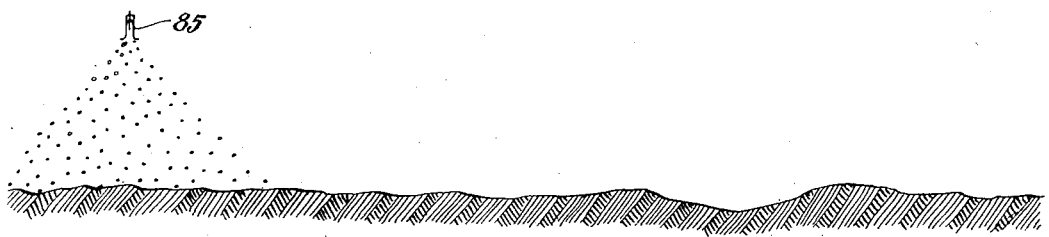
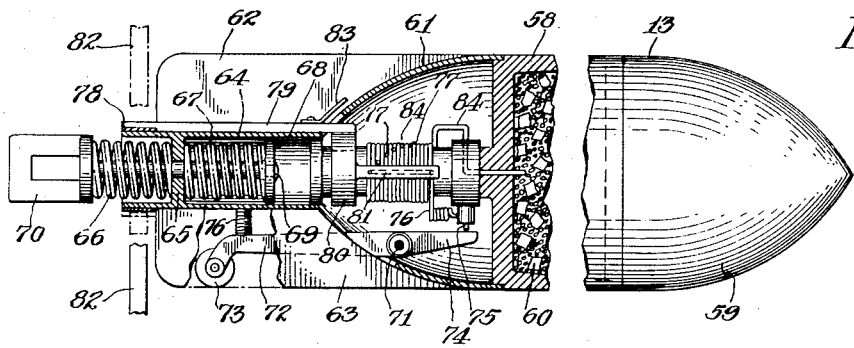
Fig. 5,
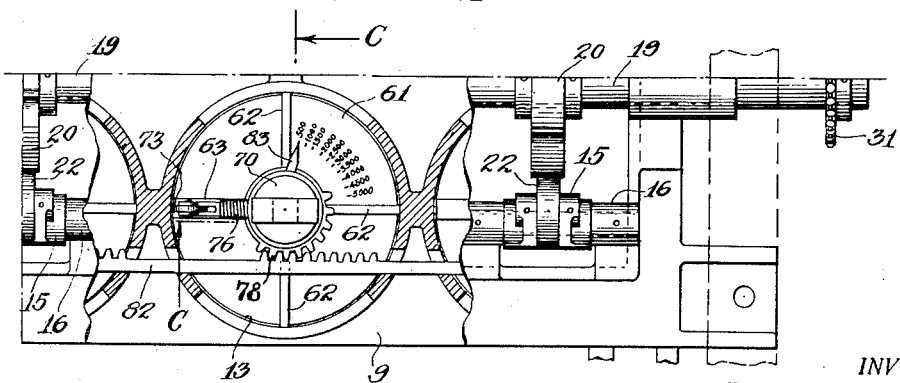
Fig. 6,
INVENTORS
Paul Gerli and Oscar A. Ross
BY
Kerr, Page, Cooper & Hayward ATTORNEYS.

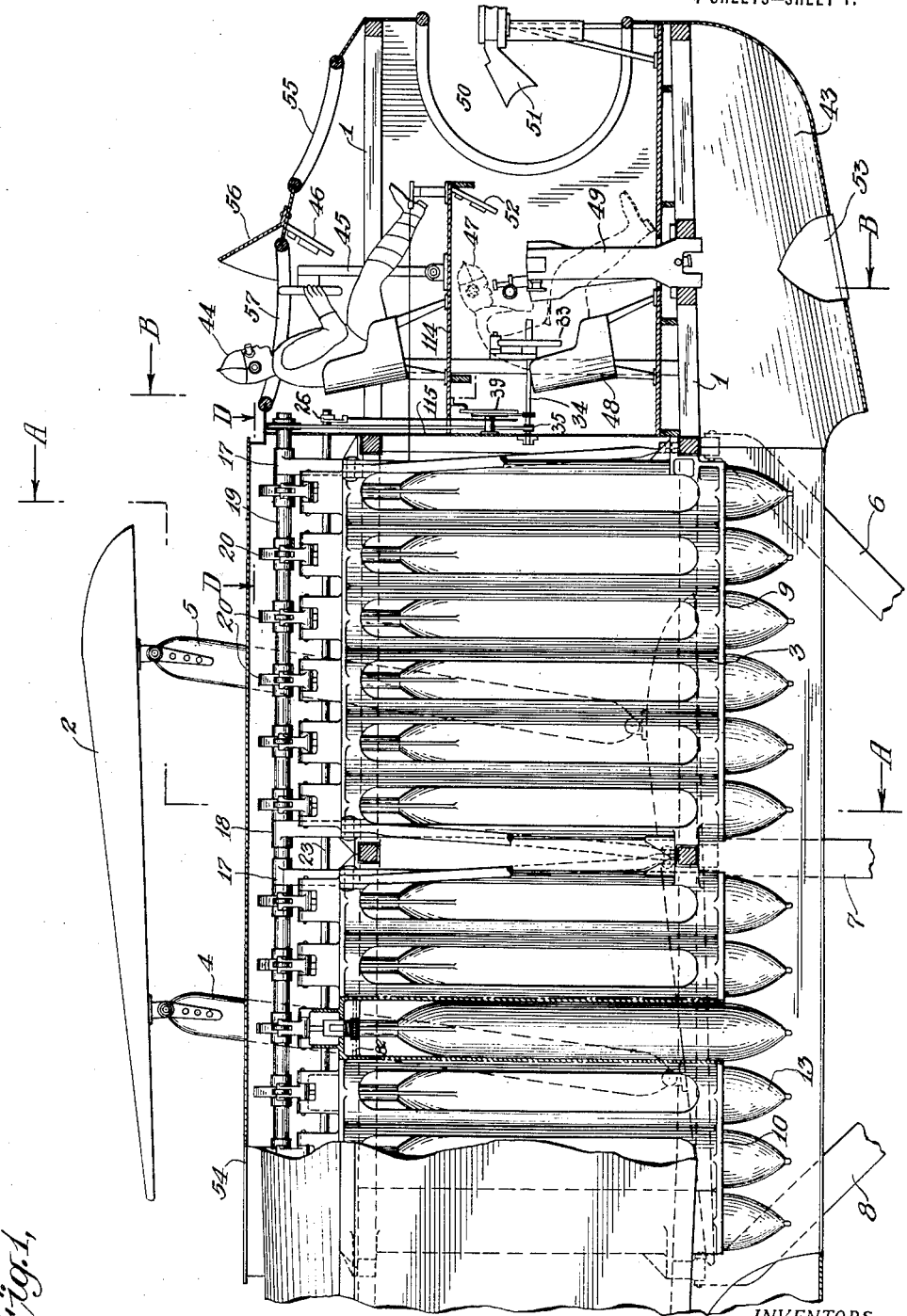

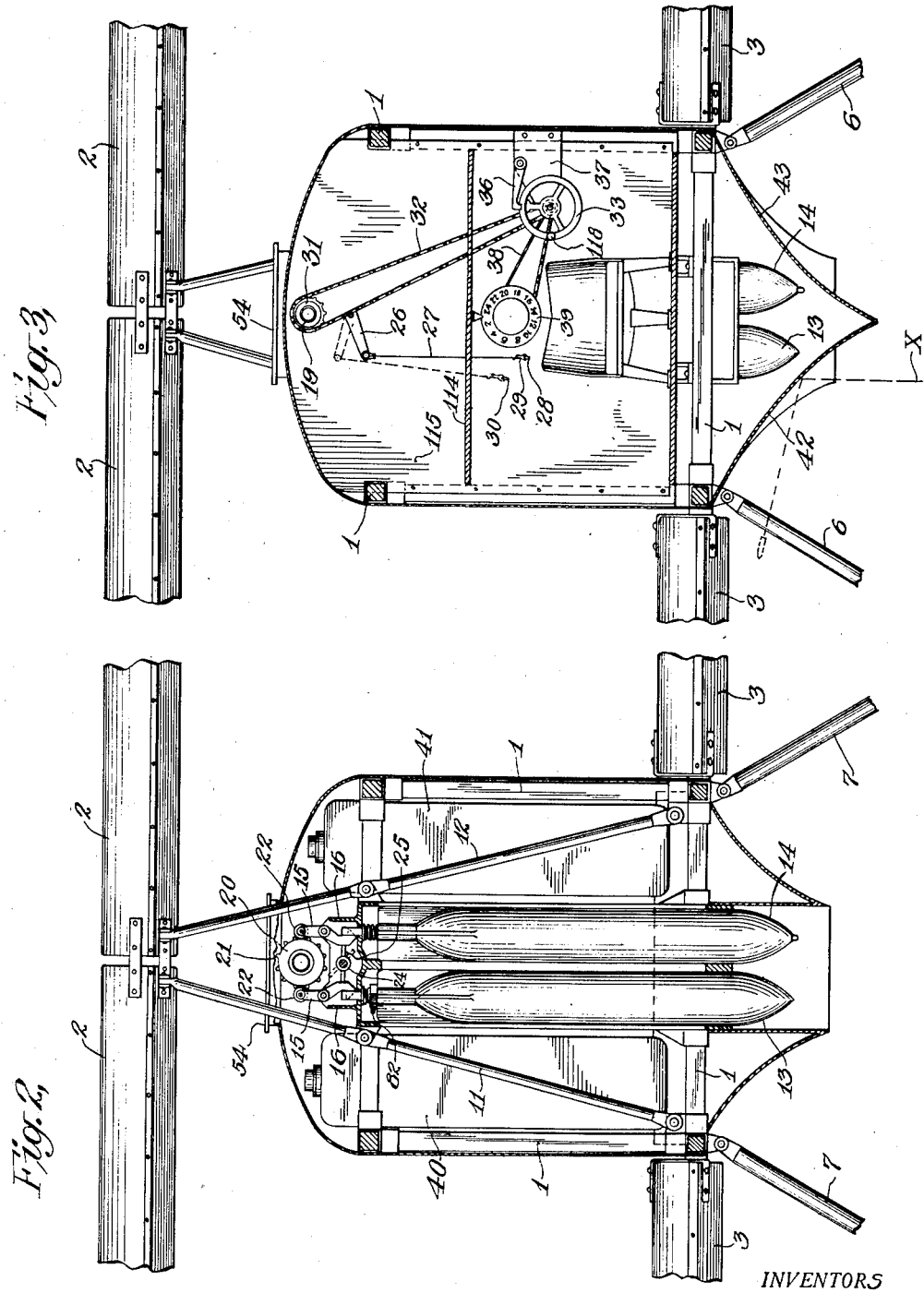

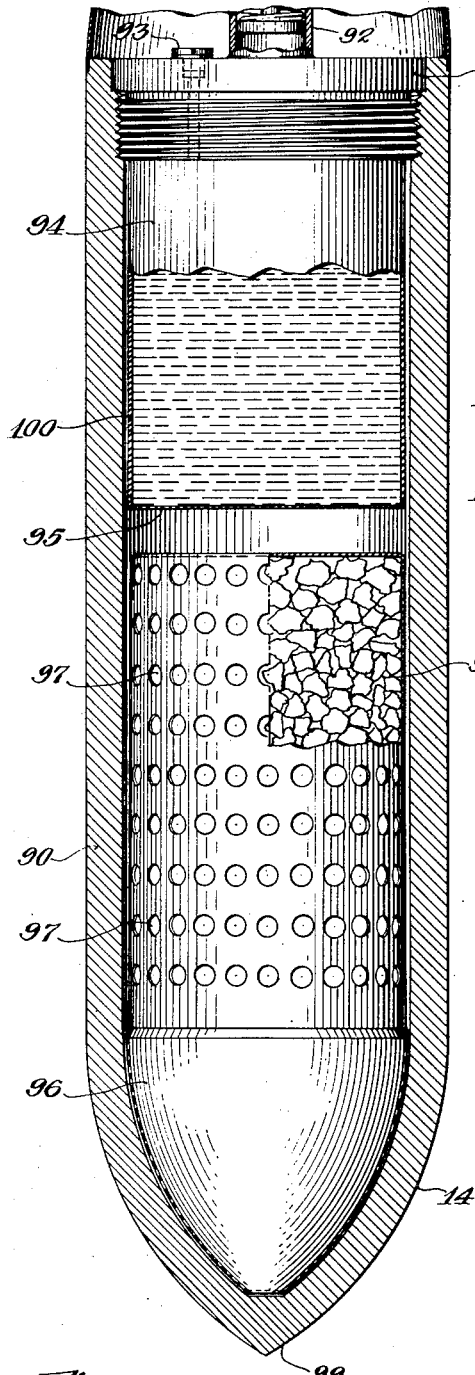
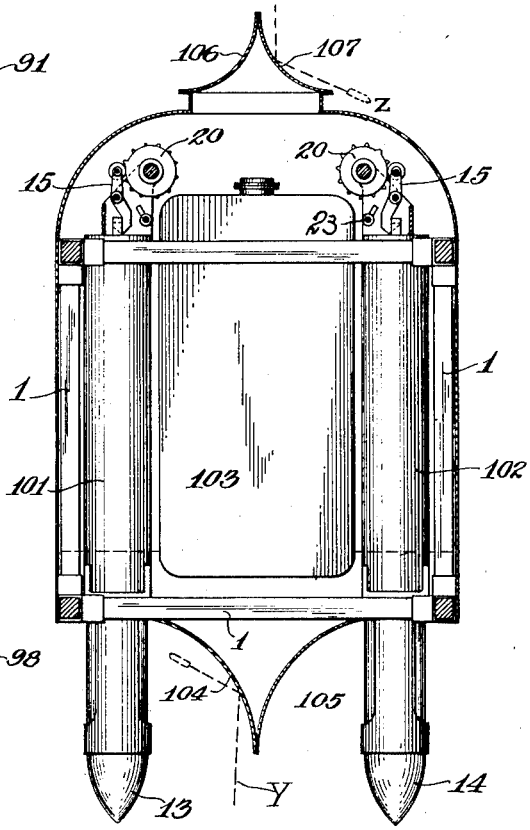
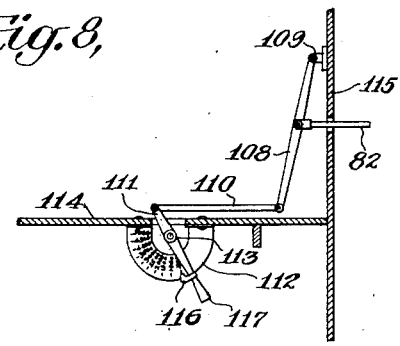

UNITED STATES PATENT OFFICE.

PAUL GERLI AND OSCAR A. ROSS, OF NEW YORK, N. Y.

ARTILLERY-AIRPLANE OR THE LIKE.

1,342,802.   Specification of Letters Patent.   Patented June 8, 1920.

Application filed June 15, 1918. Serial No. 240,264.

*To all whom it may concern:*

Be it known that we, PAUL GERLI and OSCAR A. ROSS, citizens of the United States of America, residing at New York city, in the county of New York and State of New York, have invented a new and useful Improvement in Artillery-Airplanes or the like, of which the following is a specification.

The invention upon which is based our present application for Letters Patent pertains to an artillery airplane, or the like and has for its more prominent object the attainment in a more economical and effective manner, of the results or operations as specified below.

Primarily, the object in view is to provide an artillery unit extremely effective for destruction, at the same time possessing the greatest degree of mobility.

It is a well known fact that the use of shrapnel shells have proven very effective weapons of offense. However, the shrapnel shells as at present employed are operated to a disadvantage in that the velocity of the shell is maximum in speed at the time it leaves the gun from which it is fired, and minimum in speed at the time it is exploded. It is the object of our invention to produce an artillery device whereby these conditions are reversed.

It is likewise a well known fact that by the method of firing shrapnel shells as at present employed, said shell at the time of its explosion is traveling at an angle with respect to a plane of the earth, whereby its full effect for destruction is not obtained. It is the object of our invention to correct this condition by causing a shrapnel shell to fall by virtue of the gravity in a plane, whereby, at the time a shell is exploded the shrapnel is ejected directly downward in a manner whereby the maximum effect of the shrapnel for destruction is obtained in all directions.

A further object of our invention is to provide a simple arrangement for securing shrapnel shells or bombs to an artillery airplane, whereby such shells, or bombs, may be readily released in any quantity and in any given period of time when so desired.

It is further the aim to lock said shells or bombs in position whereby they cannot be released accidentally.

It is further the aim to provide means for adjusting the timing of the shrapnel shells, whereby when they are dropped from artillery airplanes at various altitudes, they will be caused to explode at the proper height above the earth's surface, whereby the maximum results for destruction are obtained.

It is further the aim to provide a novel arrangement for shields for deflecting any bullets which may be directed at the body of an airplane in which our improvements have been incorporated.

It is further the aim to provide a novel arrangement for igniting a time fuse usually associated with shrapnel shells, as a shell is released from our improved artillery airplane.

A further aim is to provide a bomb dropping device which will be contained within the body of the airplane, thereby reducing the head resistance of exposed members such as are now usually employed.

A further aim is to supply a novel type of time exploding bomb which can be manufactured at low cost and which is very effective for destruction.

All the above and other aims sought, are attained by the preferred form of apparatus therefor, which, for purposes of specific illustration, are shown in the accompanying drawings in which:—

Figure 1, is a sectional view of one embodiment of our improvement, illustrating its adaptation to an artillery airplane, and; Fig. 2, is a sectional view of the same embodiment taken on line A—A of Fig. 1, and; Fig. 3, is likewise a sectional view of the same embodiment taken on line B—B of Fig. 1, and; Fig. 4, is a plan view, illustrating the operation of our improvement in actual service, and; Fig. 5, is an enlarged part sectional part plan view of one embodiment of the shrapnel shell as employed in our system, and is taken on line C—C of Fig. 6, and; Fig. 6, is an enlarged part plan and part sectional view of a bomb dropping apparatus, and is taken on line D—D of Fig. 1, and; Fig. 7, is an enlarged sectional view of a preferred form of bomb to be dropped from our improved bomb dropping device, and; Fig. 8, is a sectional view of a modified arrangement of the apparatus shown in Figs. 1, 2 and 3, and; Fig. 9, is a plan view of one of the controls employed therewith.

None of the various parts employed are, or need be, of any special or unusual construction, but for a more ready understanding of the system, the apparatus and its operation, a preliminary description of such parts may be apposite.

Referring to Figs. 1, 2 and 3, 1, represents the fuselage of an airplane, to which is attached the upper wing 2 and lower wing 3, interposed between which, are the interplane struts 4 and 5, said fuselage also having connected therewith the usual landing gear struts, as 6, 7 and 8.

Mounted on the fuselage 1, are the bomb housings 9 and 10, which are braced through struts 11 and 12, said housings being adapted to contain shells or bombs as 13 and 14, suspended by hooked members 15, mounted on bearing brackets 16 of said bomb housings. At the extreme end of bomb housings 9 and 10, are bearings 17 and 18, in which is mounted shaft 19, having secured thereto cams 20—20—20, etc., each one of said cams having a single tooth as 21, adapted to engage with rollers 22 of members 15, causing disengagement of said members with the shells or bombs as 13 or 14. Shaft 23 is likewise mounted on bearings 17 and 18, and has mounted thereon member 24, having projections 25, adapted to abut the lower end of members 15 whereby said members cannot be unhooked from shell or bomb as 13 and 14.

At the forward end of shaft 23 is mounted crank 26, to the outer end of which is rod 27, terminating in eye 28, adapted to be fastened over stud 29 when it is desired to lock the bombs into position, and over stud 30 when it is desired to eject said shells or bombs from housings 9 or 10. Attached to the forward end of the shaft 19, is sprocket 31, driven by chain 32, actuated by sprocket 35 mounted on shaft 34 rotated by manually operated wheel 33. Wheel 33 is adapted to be locked in position by latch 36 mounted on bracket 37 attached to fuselage 1. Also driven by shaft 34 through chain 38, is indicator 39, said indicator designating the number of shells or bombs which have been released by the bombing apparatus. 40 and 41 are fuel tanks as usually employed on airplanes and are employed to supply fuel to its motors (not shown).

Attached to fuselage 1 and projecting upward are deflector plates 42 and 43, adapted to deflect a bullet from an enemy gun below, and functions as indicated by the dotted line X. Pilot 44 is shown operating control column 45 and has placed before him the usual instrument board 46, this instrument board being preferably of the type as disclosed in our application for Letters Patent, Serial No. 221,497 filed March 9, 1918. Immediately below said pilot is observer 47 seated in chair 48 and making observations through the range finding and sighting instrument 49, this instrument being preferably of the construction as disclosed by the aforesaid application for Letters Patent. Arranged on the opening 50 of the body of the airplane is machine gun 51, being mounted in the manner well known. The observer 47 is likewise supplied with an instrument board 52, this being preferably a duplicate of board 46.

Referring to Fig. 5, 58 is a shrapnel container, forming a complete shell as 13 of Figs. 1, 2 and 3, the lower end of which is closed by dummy head 59, and contains shrapnel 60 and the necessary explosive for its ejection. Attached to container 58, is the housing 61, having vanes 62 and 63 adapted to maintain said shell in alinement during its downward flight. Also forming a part of shell 61 is the tubular extension 64, having a diaphragm 65 adapted to receive the impinged pressures of springs 66 and 67. The lower end of spring 67 impinges on disk 68 secured to rod 69, forming part of eye terminal 70, from which said shell is suspended. The upper end of spring 66 impinges against the lower head of said eye 70. In this manner the entire shrapnel shell is supported under spring tension, whereby its movement either upward or downward, is cushioned by springs 66 or 67, thereby absorbing all landing shocks which might not ordinarily be absorbed by the landing gear of the airplane.

Pivoted in housing 61 on pin 71, is lever 72, having roller 73 at its upper end, and extension 74 at its lower end adapted to strike primer pin 75. Lever 72 is under the control of springs 76, whereby, as said shell is ejected from the housings as 9 or 10, said lever is forced outward, thereby causing extension 74 to strike the primer pin 75, in this manner igniting fuse 76, said fuse communicating its fire to any one of the ignition points as 77—77, as more fully hereinafter described.

Sector gear 78 rotatively mounted on the upper extension of sleeve 64, has member 79 terminating in collar 80, said collar having extension 81 carrying one end of fuse 76, the other end of which connects with the primer. By rotating sector gear 78 by means of rack rod 82, collar 80, and therefore extension 81, is caused to be rotated, whereby the fire from fuse 76 may be communicated to any one of ignition points 77, the point chosen being dependent on the altitude from which the shell is ejected from its housing and as indicated by the pointer 83. The timing of the fuse 84 from a given contact point 77 is such, that when a shell is dropped from a given altitude and the proper adjustment of collar 80 is made for that altitude, the shell will burst at a distance above the earth whereby a maximum effect for destruction is obtained. As fuse 84 burns, its fire is eventually communicated to the interior of shell 58 causing its explosion. One of such shells indicated as 85, Fig. 4 being shown at the instant of explosion. Another shell 86, is shown in a downward flight. This shell will likewise explode at the same altitude as that of shell 85, and the shrapnel from shell 86 will overlap the territory of that reached by shell 85, thereby leaving very little opportunity for living objects to escape destruction. The statements made concerning shell 86 is also true of shell 87 shown as just leaving artillery airplane 88, to which our improved bomb dropping device has been attached.

It is evident that if required, a bomb of the type exploded by contact or impact may be ejected from housings 9 and 10, in the same manner as the shrapnel shells hereinbefore referred to. One of such shells is shown in Fig. 7, its construction differing from the usual bomb in the fact that, the explosive contents are composed of calcium carbid and water adapted, when in contact with each other, to develop acetylene gas of such abnormal pressure that explosion is caused due to the friction and heat of the molecules under such pressure. This shell is composed of metallic housing 90, having cap 91, terminating in sleeve 92, on which is mounted a unit (not shown) composed of springs 66—67, washer 68, rod 69 and eye 70, thereby providing means for suspension of the bomb in the same flexible manner as shells 13 are suspended. Attached to cap 91, and adapted to be filled through the opening closed by plug 93, is tank or vessel 94, having attached at its lower end, by very soft solder, the thin plate 95, said tank containing preferably water or other liquid adapted to gasify the calcium carbid.

At the lower end of shell 90 is vessel 96, having a series of perforations 97—97, said vessel being filled with granules of calcium carbid 98. After shell 14 has been ejected from its housings as 9 or 10, and strikes an object with its nose 99, the inertia of the liquid contained in vessel 94 forcing downward, causes plate 95 to be torn from the shell 100 of vessel 94, and the liquid contained therein flows downward along the sides of container 96, entering through holes 97—97, thereafter contacting with the calcium carbid 98, causing its conversion into acetylene gas. Due to the enormous quantity of gas generated, and the resulting heat and pressure, the friction of the molecules causes spontaneous combustion resulting in a terrific explosion.

Referring to the modification shown in Fig. 8, the housing as 9 or 10 has been divided into two units 101 and 102, having a gasolene tank 103 interposed therebetween. By this arrangement tank 103 is offered a maximum protection from enemy bullets which may be directed at the side of the airplane to which it is attached. The deflecting plates 104 and 105 are arranged to deflect any bullets which may be directed upward as indicated by dotted line Y. Likewise shields 106 and 107 are provided whereby, any enemy bullets which may be directed from above are deflected as indicated by dotted line Z.

Referring to Fig. 9, rod 82, adapted to move sector gear 78, shown on Fig. 5, terminates in lever 108 pivoted on bracket 109. Said lever at its lower end is pivoted to link 110, connected to the upper end of hand operated lever 111, said lever being pivoted to dial plate 112, by pin 113, said dial plate being suitably secured to floor 114. Lever 111 has attached thereto pointer 116 adapted to graduate with altitude values shown on dial 112, said pointer by movement to any one of said graduations causing the rod 82, through link 110 and lever 108, to cause sector collar 78 to rotate, whereby said pointer 83 will move to the corresponding altitude as shown engraved on the housing 61 of shell 13. The handle 117 of lever 111 is placed adjacent to the observer 47 whereby after he has observed the altitude as indicated by the altitude meter on the instrument board 52, he can move said lever whereby pointer 116 registers with the altitude called for by said meter.

The operation of our improved arrangement for dropping bombs is as follows:— After the shells or bombs have been loaded into the housings as 9 or 10, the rod 27 is shifted from pin 30 to pin 29, thereby positively locking the hooked members 15, whereby it will be impossible for the shells or bombs as 13 and 14 to be accidentally ejected from the airplane as said airplane ascends from or descends to the earth. After a point on enemy territory has been reached, where it is decided to drop the shells or bombs as 13 and 14, rod 27 is transferred from lug 30 to lug 29, and after the object or objects for destruction have been sighted by instrument 49, the observer raises the latch 36, thereafter rotating wheel 33, through handle 118, in this manner causing shaft 19 to rotate whereby the various lugs as 21, on cams 20, causes the hooked members 15 to disengage from the eye 70, thereby permitting the dropping of said shells or bombs, the quantity dropped being indicated by the dial 39.

From the foregoing it will be evident that by dropping shrapnel shells of the type herein disclosed from high altitudes, such shells will be traveling at an enormous velocity of speed at the instant of their explosion, in this manner causing an enormous downward speed to the shrapnel ejected from said shell. It will be evident therefore that shrapnel shells employed in this manner will be far more efficient than the ones fired from the usual field piece.

Further, it will be evident that in the event of surprise attacks by the enemy an aerial artillery apparatus of the type we have disclosed, can be quickly transported to the scene of such surprise attack for an effective check.

What we claim is:—

1. In an artillery airplane, a body, airplane surfaces attached thereto adapted to maintain said body in aerial flight, a projectile housing attached to said body, one or more shrapnel shells contained within said housing, means for releasing said shells from said housing, means for igniting the time fuse of said shell as said shell is ejected from said housing, and means mounted on the body for adjusting the time of a fuse on a housed shell.

2. In an artillery airplane, a body, airplane surfaces attached thereto to maintain said body in flight, a projectile housing attached to said body, one or more shrapnel shells contained within said housing, means for releasing said shells from said housing, means operable as the projectile clears the body for igniting the time fuse of said shell, and means for simultaneously presetting a plurality of said fuses in accordance with the altitude of the airplane.

In testimony whereof, PAUL GERLI and OSCAR A. ROSS, have signed their names to this specification, this 11th day of June, 1918.

PAUL GERLI.
OSCAR A. ROSS.